United States Patent
Koyama et al.

(10) Patent No.: US 11,705,551 B2
(45) Date of Patent: Jul. 18, 2023

(54) METHOD FOR MANUFACTURING ELECTRODE MATERIAL

(71) Applicant: HONDA MOTOR CO., LTD., Tokyo (JP)

(72) Inventors: Rio Koyama, Tochigi (JP); Yasuro Katsuyama, Tochigi (JP); Masaki Kunigami, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 161 days.

(21) Appl. No.: 17/125,947

(22) Filed: Dec. 17, 2020

(65) Prior Publication Data

US 2021/0193983 A1   Jun. 24, 2021

(30) Foreign Application Priority Data

Dec. 19, 2019 (JP) .................................. 2019-229150

(51) Int. Cl.
*H01M 4/04* (2006.01)
*H01M 10/0525* (2010.01)
*H01M 10/0562* (2010.01)

(52) U.S. Cl.
CPC ..... *H01M 4/0407* (2013.01); *H01M 10/0525* (2013.01); *H01M 10/0562* (2013.01); *H01M 2300/0071* (2013.01)

(58) Field of Classification Search
CPC ......... H01M 10/0525; H01M 10/0562; H01M 2300/0068; H01M 2300/0071; H01M 4/0407; H01M 4/366; H01M 4/62; H01M 4/624; Y02E 60/10
See application file for complete search history.

(56) References Cited

U.S. PATENT DOCUMENTS

2014/0057180 A1   2/2014 Iwasaki et al.
2017/0244097 A1*  8/2017 Ose ........................ H01M 4/136

FOREIGN PATENT DOCUMENTS

JP   2015170477 A   9/2015
JP   2017220318 A   12/2017
WO   2012157046 A1  11/2012

OTHER PUBLICATIONS

Machine Translation JP2017220318A (Year: 2017).*

* cited by examiner

*Primary Examiner* — Victoria H Lynch
(74) *Attorney, Agent, or Firm* — CKC & Partners Co., LLC (57) ABSTRACT

An electrode material manufacturing method is a method for manufacturing an electrode material (50) of an all-solid-state battery, and the method includes: the step of preparing a coated active substance to prepare a coated active substance (10) containing a positive electrode active substance 11 and a coating layer (12) of an oxide-based solid-electrolyte that covers at least a portion of a surface thereof; the step of first compositing to manufacture a first composite material (20) by covering at least a portion of a surface of the solid electrolyte (21) with a conductive auxiliary agent (22); the step of second compositing to manufacture a second composite material (40) by covering a surface of the coated active substance (10) with the first composite material (20); and the step of mixing the second composite material (40), the conductive auxiliary agent (22), and the solid electrolyte (21) to manufacture an electrode material (50).

4 Claims, 7 Drawing Sheets

METHOD FOR MANUFACTURING ELECTRODE MATERIAL

This application is based on and claims the benefit of priority from Japanese Patent Application No. 2019-229150, filed on 19 Dec. 2019, the content of which is incorporated herein by reference.

BACKGROUND OF THE INVENTION

Field of the Invention

The present invention relates to a method for manufacturing an electrode material and an electrode material. More specifically, the present invention relates to an electrode material for use in an all-solid-state battery and a method for manufacturing an electrode material for manufacturing this electrode material.

Related Art

In recent years, as a secondary battery to be mounted on an electric vehicle such as an electric vehicle or a hybrid vehicle, a lithium-ion battery having a high energy density is widely used. Since an electrolytic solution containing a combustible organic solvent is used in the lithium-ion battery, it is necessary to provide a safety device in order to suppress a temperature rise at the time of short circuit. On the other hand, in recent years, a so-called all-solid-state battery has been proposed in which the secondary battery is totally solidified by replacing the electrolytic solution with a solid electrolyte layer.

In addition, in the field of such an all-solid-state battery, as an electrode material used for a positive electrode active material layer, a coated active material has been proposed in which a surface of an active material is coated with a coating layer containing an oxide-based solid electrolyte. According to the electrode material having such a coated active material, by coating the surface of the active material as a supply source of lithium ions with a coating layer containing an oxide-based solid electrolyte, the interfacial resistance between the coated active material and the sulfide-based solid electrolyte in contact therewith can be reduced and the ionic conductivity can be improved. In addition, in the electrode material disclosed in WO2012/157046, a conductive auxiliary agent is contained in the coating layer of the coated active material in addition to the oxide-based solid electrolyte, thereby improving the electron conductivity of the electrode material.

SUMMARY OF THE INVENTION

In recent years, a technique has been proposed in which an active material and a solid electrolyte are composited by coating a surface of an active material with a solid electrolyte in a sprinkled manner.

Figure 7:
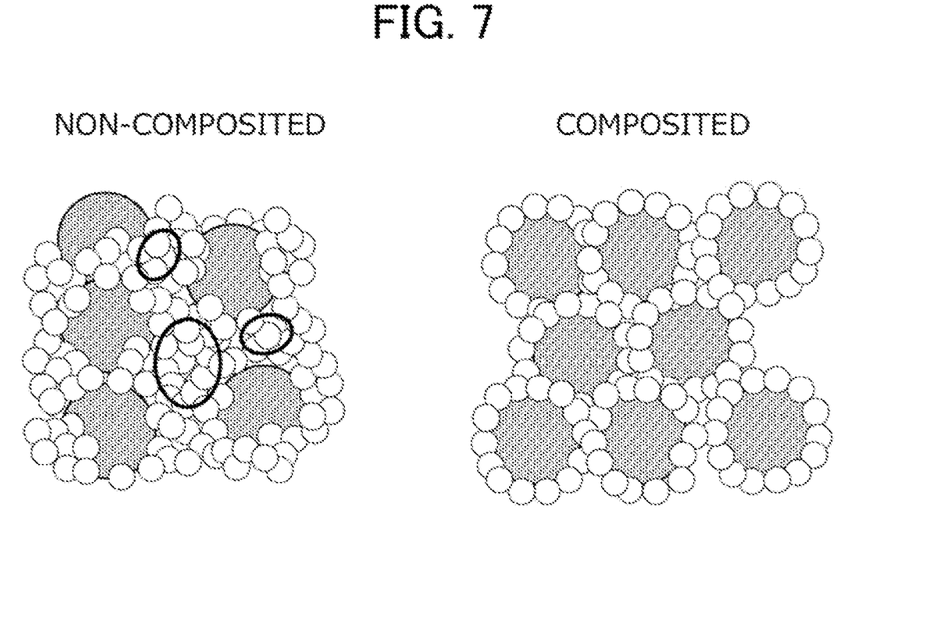
FIG. 7 is a diagram schematically showing an electrode material using an active material that is not composited (left side) and an electrode material using an active material that is composited (right side)
Figure 8:
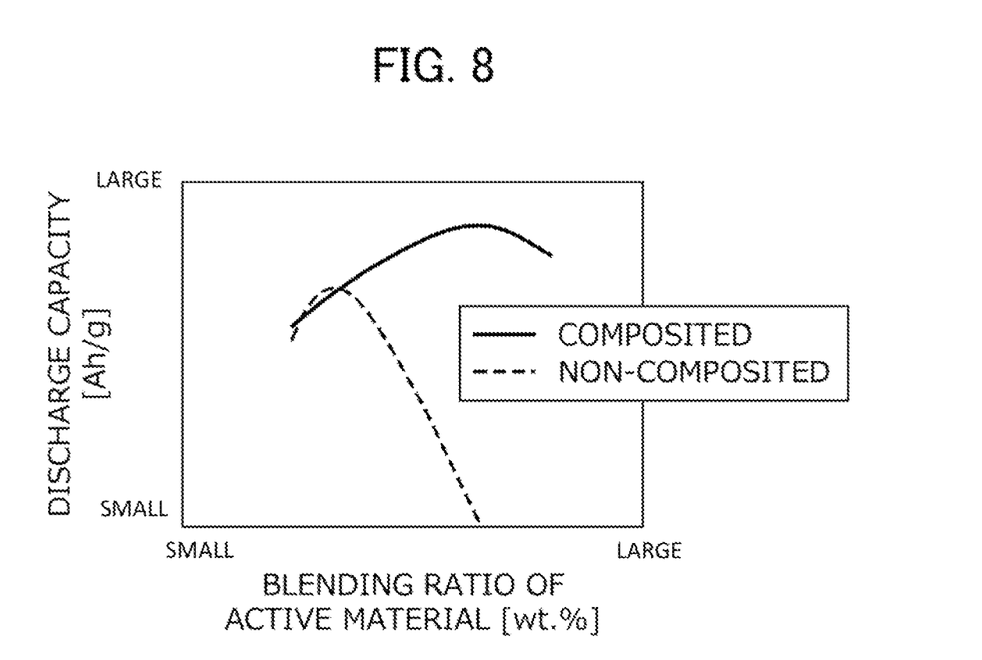
FIG. 8 is a diagram comparing the relationship between the blending ratio of the active material and the discharge capacity between a case of using an active material which is not composited and a case of using an active material which is composited.

FIG. 7 illustrates a diagram schematically showing on the left side an electrode material using an active material that is not composited, and illustrates a diagram schematically showing on the right side an electrode material using an active material that is composited. Furthermore, FIG. 8 is a diagram showing the relationship between the blending ratio wt. % of the active material (horizontal axis) and the discharge capacity per mass mAh/g of the electrode material (vertical axis), and compares a case of using an active material that is composited with a case of using an active material that is not composited.

As shown by a thick line on the left side of FIG. 7, in the electrode material using an active material that is not composited, solid electrolyte which is not in contact with the active material is abundantly present. In contrast, as shown on the right side of FIG. 7, in the electrode material using the composited active material, the amount of the solid electrolyte not in contact with the active material is reduced. For this reason, as shown in FIG. 8, the optimal blending ratio of the active material at which discharge capacity is maximized is larger in the case of using the composite active material than the case of using the active material that is not composited. Furthermore, the maximum discharge capacity at the optimum blending ratio is also larger in the case of using the composite active material than the case of using the active material which is not composited.

By compositing the active material and the solid electrolyte as described above, it is possible to increase the optimal blending ratio of the active material and the maximum discharge capacity. However, if the active material and the solid electrolyte are simply composited, the active material coated by the solid electrolyte is isolated, and thus, the electron conductivity is lowered. Therefore, although it is conceivable to composite the active material, the solid electrolyte, and the conductive auxiliary agent, it has not been sufficiently examined how to composite specifically the conductive auxiliary agent to achieve both ionic conductivity and electron conductivity.

It is an object of the present invention to provide an electrode material of an all-solid-state battery having both ionic conductivity and electron conductivity, and a method of manufacturing the same.

A first aspect of the present invention relates to a method for manufacturing an electrode material (for example, an electrode material 50 described later) of an all-solid-state battery (for example, an all-solid-state battery 60 described above), the method including the steps of: first compositing (for example, the step of first compositing described later) to manufacture a first composite material (for example, a first composite material 20 described later) by covering at least a portion of a surface of a solid electrolyte (for example, a solid electrolyte 21 described later) with a conductive auxiliary agent (for example, a conductive auxiliary agent 22 described later); and second compositing (for example, the step of second compositing described later) to cover with the first composite material at least a portion of a surface of an active material (for example, a coated active substance 10 and a positive electrode active substance 11) including at least an active substance (for example, a positive electrode active substance 11 described later).

According to a second aspect of the present invention, in such a case, it is preferable for the method to further include the step of manufacturing (for example, the step of preparing a coated active substance described later) a coated active substance (for example, a coated active substance 10 described later) by covering with an oxide-based solid electrolyte (for example, a coating layer 12 described later) at least a portion of a surface of the active substance, in which the second compositing preferably further includes covering, with the coated active substance as the active material, at least a portion of a surface of the active material with the first composite material.

According to a third aspect of the present invention, in such a case, it is preferable for the electrode material manufacturing method to further include the step of mixing (for example, the step of mixing described later) to mix a second composite material (for example, a second composite material 40 described later) obtained in the step of second compositing, a conductive auxiliary agent (for example, a conductive auxiliary agent 22 described later), and a solid electrolyte (for example, a solid electrolyte 21 described later) to manufacture an electrode material (for example, an electrode material 50 described later).

A fourth aspect of the present invention relates to an electrode material (for example, an electrode material 50 described later) of an all-solid-state battery (for example, an all-solid-state battery 60 described later) including: an active material (for example, a coated active substance 10 and a positive electrode active substance 11 described later) containing at least an active substance (for example, a positive electrode active substance 11 described later); and a composite material (for example, a first composite material 20 described later) including a solid electrolyte (for example, a solid electrolyte 21 described later) and a conductive auxiliary agent (for example, a conductive auxiliary agent 22 described later) that covers at least a portion of a surface of the solid electrolyte, in which at least a portion of a surface of the active material is covered with the composite material.

According to a fifth aspect of the present invention, in such a case, the active material preferably contains a coated active substance (for example, a coated active substance 10 described later) including an oxide-based solid electrolyte (for example, a coating layer 12 described later) that covers at least a portion of the surface of the active substance.

According to the first aspect, in the electrode material manufacturing method of the present invention, a first composite material is manufactured by coating at least a portion of a surface of a solid electrolyte serving as a path of ions supplied from an active substance, with a conductive auxiliary agent. This makes it possible to impart electron conductivity to the first composite material. Furthermore, in the electrode material manufacturing method of the present invention, since the surface of the active material at least containing the active substance is coated with the first composite material to which electron conductivity is imparted as described above, the solid electrolyte and the conductive auxiliary agent can be brought into contact with the surface of the active material without bias, a result of which an electrode material capable of achieving both ionic conductivity and electron conductivity can be obtained.

According to the second aspect, in the electrode material manufacturing method of the present invention, by coating at least a portion of the surface of the coated active material containing an oxide-based solid electrolyte that coats at least a portion of the surface of the active substance with the first composite material, the interfacial resistance between the coated active material and the first composite material in contact therewith can be reduced, and the ionic conductivity can be improved.

According to the third aspect, in the electrode material manufacturing method of the present invention, an electrode material is manufactured by mixing a second composite material manufactured by coating a surface of an active material with a first composite material as described above, a conductive auxiliary agent, and a solid electrolyte. Thus, it is possible to adjust the blending ratio of the active material, the solid electrolyte and the conductive auxiliary agent in the entire electrode material.

According to the fourth aspect, according to the electrode material of the present invention, by using a composite material containing a solid electrolyte serving as a path of ions supplied from an active substance and a conductive auxiliary agent for coating at least a portion of the surface thereof, electron conductivity can be imparted to this composite material. Furthermore, according to the electrode material of the present invention, by coating at least a portion of the surface of the active material with the composite material as described above, the solid electrolyte and the conductive auxiliary agent are brought into contact with the surface of the active material without bias, a result of which both the ionic conductivity and the electron conductivity of the electrode material can be achieved.

According to the fifth aspect, according to the electrode material of the present invention, by coating at least a portion of the surface of the coated active material containing an oxide-based solid electrolyte for coating at least a portion of the surface of the active substance with a composite material, it is possible to reduce the interfacial resistance between the coated active material and the composite material in contact therewith and to improve the ionic conductivity.

DETAILED DESCRIPTION OF THE INVENTION

Figure 1:
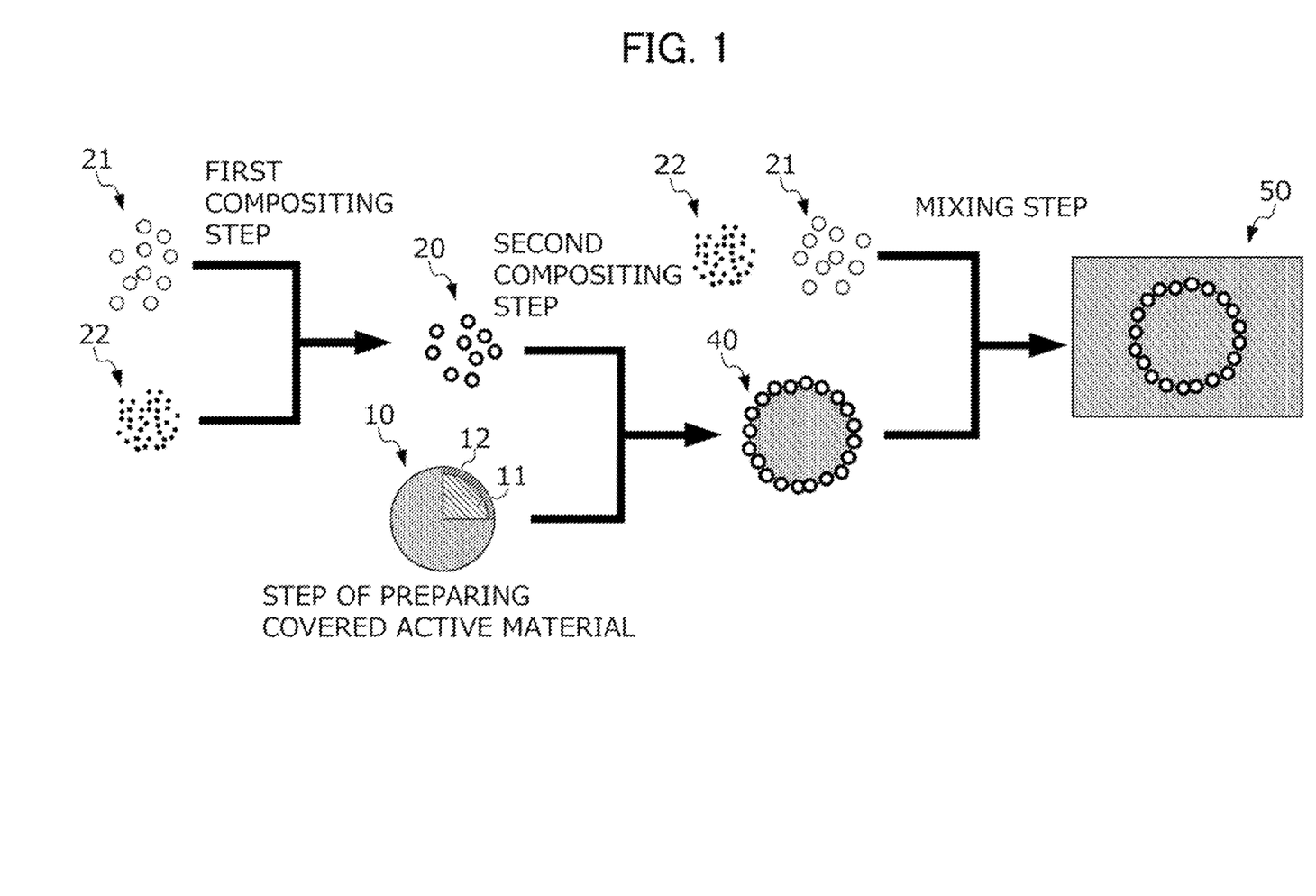
FIG. 1 is a diagram schematically showing a procedure of an electrode material manufacturing method for manufacturing an electrode material of an all-solid-state battery according to an embodiment of the present invention.

Hereinafter, an embodiment of the present invention will be described with reference to the drawings. FIG. 1 is a diagram showing a procedure of an electrode material manufacturing method according to an embodiment of the present invention. Hereinafter, a case in which the electrode material used in a positive electrode active material layer of an all-solid battery is manufactured by an electrode material manufacturing method according to the present invention will be described. However, the present invention is not limited thereto. The electrode material manufacturing method according to the present invention is also applicable to manufacturing an electrode material used in a negative electrode active material layer of an all-solid battery.

As shown in FIG. 1, the electrode material manufacturing method includes a step of preparing a coated active material, a first compositing step, a second compositing step, and a mixing step. Hereinafter, the contents of each step will be described in the order of the step of preparing a coated active material, the first compositing step, the second compositing step, and the mixing step. However, the order of performing each step is not limited thereto. For example, the step of preparing a coated active material may be performed at any time before the second compositing step.

<Step of Preparing Coated Active Material>

In the step of preparing a coated active material, a coated active material 10 containing a positive electrode active material 11 and a coating layer 12 covering at least a portion of the surface of the positive electrode active material 11 is prepared.

Here, the positive electrode active material 11 for use in the coated active material 10 is not particularly limited as long as it can occlude and release lithium ions, and examples thereof include $LiCoO_2$, $LiCoO_4$, $LiMn_2O_4$, $LiNiO_2$, $LiFePO_4$, lithium sulfide, and sulfur. As a material for forming the coating layer 12, an oxide-based solid electrolyte is preferably used. Furthermore, as the oxide-based solid electrolyte, for example, lithium niobate ($LiNbO_3$) is preferably used; however, the present invention is not particularly limited thereto. Furthermore, the material for forming the coating layer 12 is not limited to an oxide-based solid electrolyte as long as it lowers the interfacial resistance and improves the ionic conductivity.

It should be noted that, as shown in FIG. 1, the coating layer 12 of the oxide-based solid electrolyte is in the form of a film without grain boundaries, and preferably covers all of the surface of the positive electrode active material 11. As a result, the grain boundary resistance of the coated active material 10 can be reduced. The film-like coating layer 12 without such grain boundaries is formed by, for example, spray coating.

<First Compositing Step>

In the first compositing step, a solid electrolyte 21 and a conductive auxiliary agent 22 weighed at a predetermined blending ratio are composited by a dry compositing device, thereby producing a first composite material 20 containing the solid electrolyte 21 and the conductive auxiliary agent 22 coating at least a portion of the surface of the solid electrolyte 21.

The conductive auxiliary agent 22 having a smaller particle size than that of the solid electrolyte 21 is used so that the surface of the solid electrolyte 21 is coated with the conductive auxiliary agent 22 with preferable coverage. Furthermore, in the subsequent second compositing step, the solid electrolyte 21 and the conductive auxiliary agent 22 each having a smaller particle size than that of the coated active material 10 are used so that the surface of the coated active material 10 is coated with the first composite material 20 with preferable coverage.

Examples of the solid electrolyte 21 used in the first composite material 20 preferably include inorganic solid electrolytes such as oxide-based solid electrolytes and sulfide-based solid electrolytes. Among them, a sulfide-based solid electrolyte is preferred because of its high lithium-ion conductivity and easy interface formation with an active material. Furthermore, the conductive auxiliary agent 22 is not particularly limited as long as it has electron conductivity, and examples thereof include a carbon material and a metal material. More specifically, acetylene black is preferably used as the conductive auxiliary agent 22.

Figure 2:
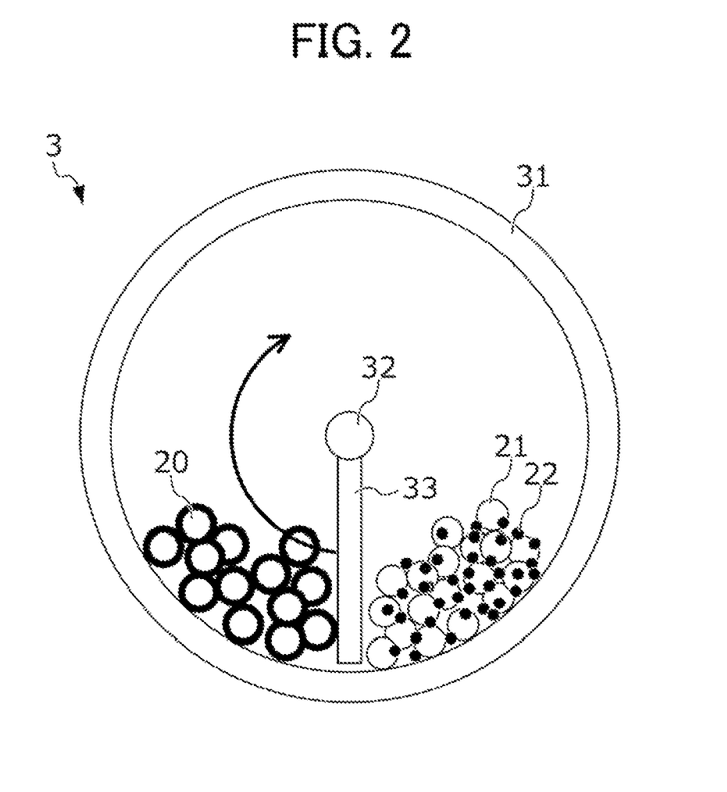
FIG. 2 is a diagram showing an example of a compositing device.

FIG. 2 is a diagram showing an example of a compositing device 3 used in the first compositing step. The compositing device 3 includes a cylindrical drum 31, and a rotor 33 which is rotatably provided in the drum 31 about a shaft 32 provided at the center of the drum 31. A slight clearance is provided between the leading end portion of the rotor 33 and the inner peripheral surface of the drum 31.

In the first compositing step, the solid electrolyte 21 and the conductive auxiliary agent 22 weighed at a predetermined blending ratio are charged into the drum 31, and the rotor 33 is rotated at a predetermined rotation speed for a predetermined time. Then, the conductive auxiliary agent 22 aggregated multiply in the drum 31 is crushed by the shear force between the leading end portion of the rotor 33 and the inner peripheral surface of the drum 31. Furthermore, the crushed conductive auxiliary agent 22 collides with the solid electrolyte 21 in the drum 31 and adheres to the surface of the solid electrolyte 21. Thus, at least a portion of the surface of the solid electrolyte 21 is coated with the conductive auxiliary agent 22, whereby the first composite material 20 can be manufactured.

It should be noted that it is possible to perform such compositing processing using a ball mill. However, in a case of using the ball mill, it is necessary to take out the balls after the processing, and since the balls and the solid electrolyte 21 collide with each other, it takes longer time to perform compositing than a case of using the compositing device 3. For this reason, in the first compositing step, it is preferable to perform the compositing processing using the compositing device 3

<Second Compositing Step>

In the second compositing step, by compositing the coated active material 10 and the first composite material 20 weighed at a predetermined blending ratio by a dry compositing device, a second composite material 40 is manufactured which contains a coated active material 10, and a first composite material 20 covering at least a portion of the surface of the coated active material 10.

It should be noted that, in the second compositing step, it is preferable to perform the compositing processing using the compositing device 3 used in the first compositing step. In other words, the coated active material 10 and the first composite material 20 weighed at a predetermined blending ratio are charged into the drum 31, and the rotor 33 is rotated at a predetermined rotation speed for a predetermined time, whereby at least a part of the surface of the coated active material 10 is coated with the first composite material 20. It should be noted that the clearance between the leading end portion of the rotor 33 and the inner peripheral surface of the drum 31 may be the same as that in the first compositing step, or may be adjusted so as to obtain a preferable second composite material 40.

<Mixing Step>

In the mixing step, an electrode material 50 is manufactured by mixing the second composite material 40, the solid electrolyte 21, and the conductive auxiliary agent 22 weighed at a predetermined blending ratio, by a ball mill. As described above, the second composite material 40 includes the coated active material 10 and the first composite material 20, and the first composite material 20 includes the solid electrolyte 21 and the conductive auxiliary agent 22. Therefore, in the mixing step, it is preferable to weigh the solid electrolyte 21 and the conductive auxiliary agent 22 to be newly charged in the mixing step, in consideration of the blending ratio of the solid electrolyte 21 and the conductive auxiliary agent 22 constituting the first composite material 20 so that a preferable blending ratio among the coated active material 10, the solid electrolyte 21, and the conductive auxiliary agent 22 is realized in the entire electrode material 50 to be finally obtained.

Figure 3:
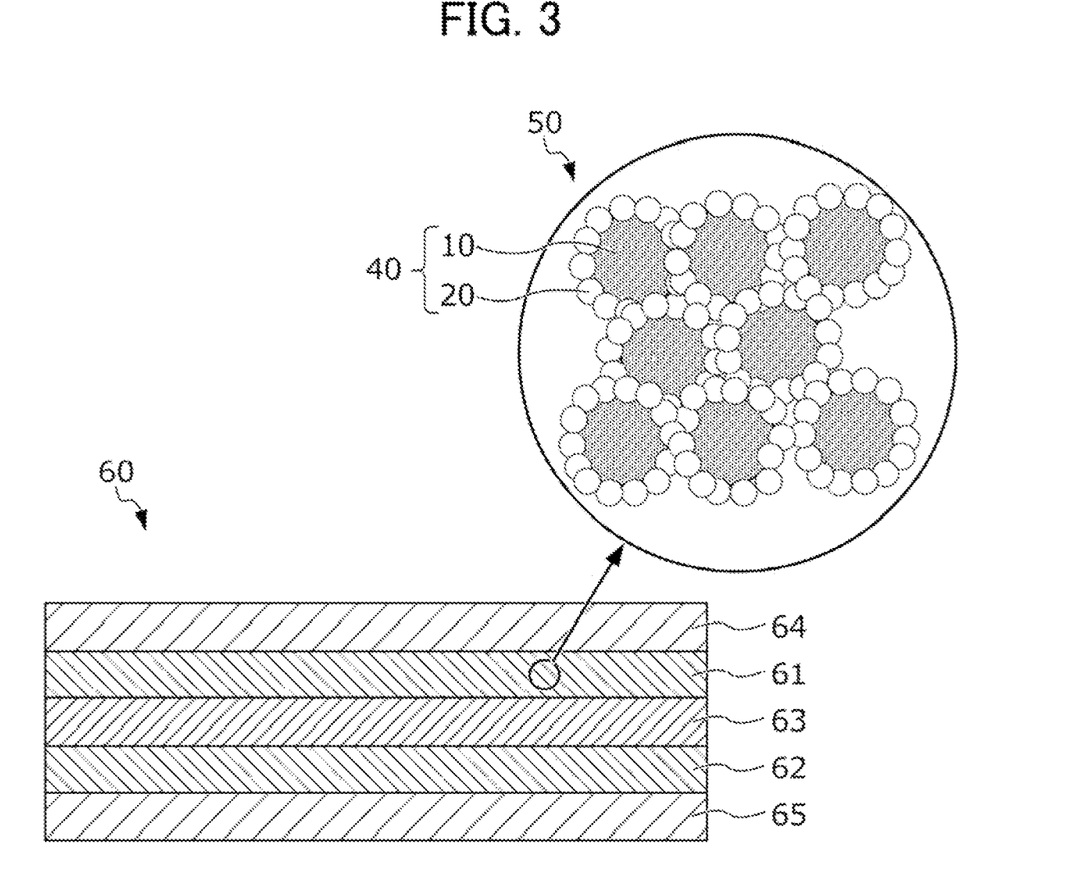
FIG. 3 is a cross-sectional view showing a laminate structure of an all-solid-state battery manufactured using an electrode material manufactured by the above-described method for manufacturing an electrode material.

FIG. 3 is a cross-sectional view showing a laminate structure of an all-solid-state battery 60 manufactured using the electrode material 50 manufactured by the above-described method of manufacturing an electrode material.

The all-solid-state battery 60 includes a positive electrode active material layer 61, a negative electrode active material layer 62, a solid electrolyte layer 63 formed between the positive electrode active material layer 61 and the negative electrode active material layer 62, a positive electrode collector 64 for collecting current of the positive electrode active material layer 61, and a negative electrode collector 65 for collecting current of the negative electrode active material layer 62.

The positive electrode active material layer 61 contains at least the electrode material 50 manufactured by the above-described electrode material manufacturing method. Accordingly, the positive electrode active material layer 61 includes the coated active material 10 containing an oxide-based solid electrolyte for coating at least a portion of a positive electrode active material and a surface thereof, the first composite material 20 containing a conductive auxiliary agent for coating at least a portion of the solid electrolyte and the surface thereof, and the second composite material 40 containing the first composite material 20 for coating at least a portion of the coated active material 10 and the surface thereof.

The negative electrode active material layer 62 contains a negative electrode active material, solid electrolyte, conductive material, binder, and the like. Examples of the negative electrode active material of the negative electrode active material layer 62 include lithium metal, a lithium alloy such as a Li—Al alloy or a Li—In alloy, lithium titanate such as $Li_4Ti_5O_{12}$, silicon oxide, metallic silicon, carbon materials such as carbon fiber and graphite. However, the present invention is not particularly limited thereto.

The solid electrolyte layer 63 is formed between the positive electrode active material layer 61 and the negative electrode active material layer 62. The solid electrolyte layer 63 contains at least a solid electrolyte material. The solid electrolyte material of the solid electrolyte layer 63 is not particularly limited as long as it has ion conductivity, and for example, a sulfide-based solid electrolyte material or an oxide-based solid electrolyte material is used.

In the positive electrode collector 64, for example, aluminum, an aluminum alloy, stainless steel, nickel, iron, titanium, or the like formed in a thin plate shape is used. It should be noted that the material of the positive electrode collector 64 is not particularly limited as long as it has a function of collecting current of the positive electrode active material layer 61.

In the negative electrode collector 65, for example, nickel, copper, stainless steel, or the like formed in a thin plate shape is used. It should be noted that the material of the negative electrode collector 65 is not particularly limited as long as it has a function of collecting current of the negative electrode active material layer 62.

Next, the results of performance evaluation tests conducted to evaluate the performance of the electrode material manufactured by the above-described method for manufacturing the electrode material will be described.

Figure 4:
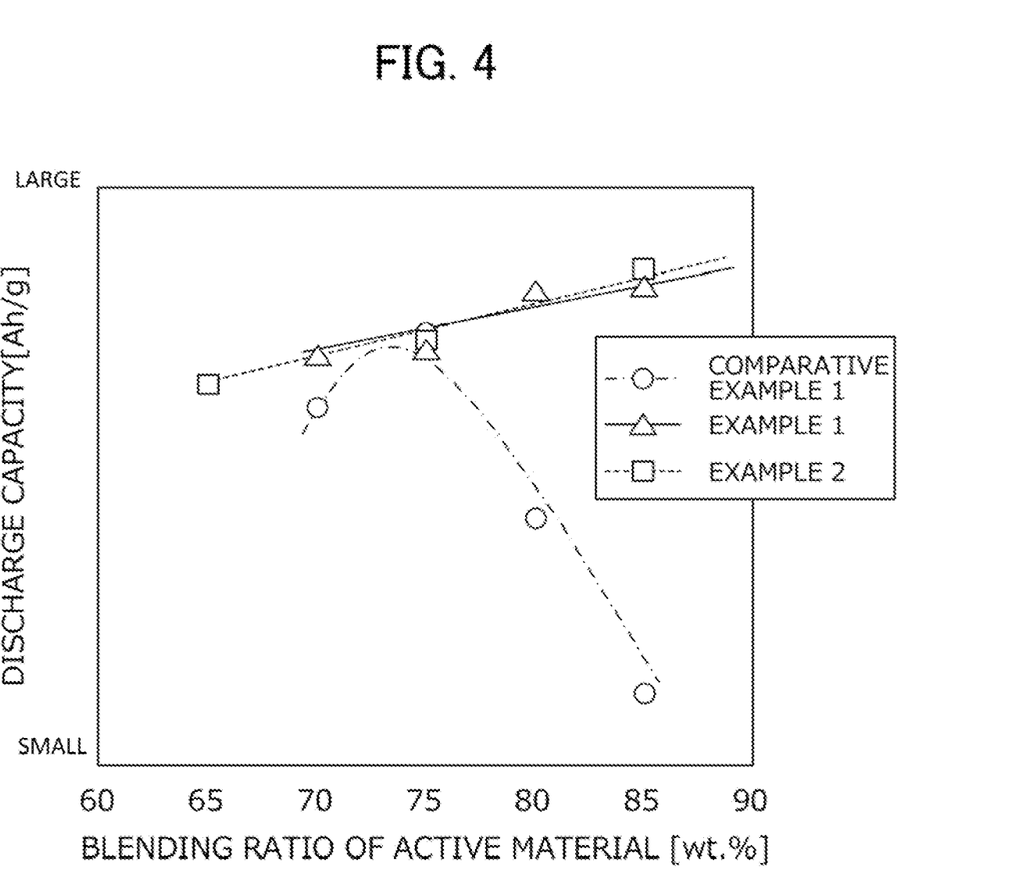
FIG. 4 is a diagram comparing the relationship between the blending ratio of the active material and the discharge capacity among Comparative Example 1, Example 1, and Example 2.

FIG. 4 is a graph comparing the relationship between the blending ratio wt. % of the active material (horizontal axis) and the discharge capacity per mass mAh/g (vertical axis) of the electrode material among Comparative Example 1, Example 1, and Example 2.

Here, in Comparative Example 1, an electrode material manufactured by mixing coated active material, solid electrolyte, and conductive auxiliary agent at a predetermined blending ratio was used. Furthermore, as shown in Table 1 below, in Comparative Example 1, the blending ratio of the coated active material was changed between 70 and 85 wt. % while keeping the blending amount of the conductive auxiliary agent constant.

In Example 1, an electrode material manufactured by an electrode material manufacturing method including the first compositing step, the second compositing step, and the mixing step as described above was used at the same blending ratio as that in Comparative Example 1. Furthermore, as shown in Table 1 below, in Example 1, the blending ratio of the coated active material was changed between 70 and 85 wt. %, while keeping the blending amount of the conductive auxiliary agent constant in the same manner as in Comparative Example 1. Furthermore, in Example 1, the compositing device 3 was used as a compositing means used in the first compositing step and the second compositing step. At this time, the rotation speed and the processing time were 4000 rpm and 12 minutes, respectively.

In addition, in Example 2, an electrode material manufactured by the above-described electrode material manufacturing method at the same blending ratio as that in Example 1 was used. Furthermore, as shown in Table 1 below, in Example 2, the blending ratio of the coated active material was changed between 65 and 85 wt. %, while keeping the blending amount of the conductive auxiliary agent constant in the same manner as that in Comparative Example 1 Furthermore, in Example 2, a ball mill was used as a compositing means used in the first compositing step and the second compositing step. At this time, the rotation speed and the processing time were 100 rpm and 120 minutes, respectively.

Furthermore, in Table 1 below, "throughput" corresponds to an amount of a substance which can be processed at once by a compositing means. More specifically, Table 1 below shows a case where the amount of a substance which can be processed when a ball mill is used as a compositing means is set to 1.

TABLE 1

| | COMPOSITING MEANS | THROUGHPUT [—] | ROTATION SPEED [rpm] | PROCESSING TIME [min] | BLENDING RATIO OF ACTIVE MATERIAL [wt. %] |
|---|---|---|---|---|---|
| COMPARATIVE EXAMPLE 1 | NON-COMPOSITED | — | — | — | 70~85 |
| EXAMPLE 1 | COMPOSITING DEVICE | 1.5 | 4000 | 12 | 70~85 |
| EXAMPLE 2 | BALL MILL | 1 | 100 | 120 | 65~85 |

As shown in FIG. 4, in Comparative Example 1 which has not undergone the step of compositing, the discharge capacity is maximized when the blending ratio of the coated active material is 75 wt. %. Furthermore, the discharge capacity of Comparative Example 1 decreases when the blending ratio of the coated active material is made larger than the optimum blending ratio at which the discharge capacity is maximized. In contrast, in Example 1 and Example 2 undergoing the first compositing step and the second compositing step as described above, the optimum blending ratio of the coated active material is 85 wt. %, which is larger than that in Comparative Example 1. Furthermore, the maximum discharge capacities realized in Example 1 and Example 2 are also larger than that in Comparative Example 1. From the above, it has been verified that the electrode material produced by undergoing the first compositing step and the second compositing step can increase the optimum blending ratio of the coated active material and increase the maximum discharge capacity than those of the electrode material produced without the compositing steps.

Furthermore, as shown in Table 1 above, in Example 2 using a ball mill as a compositing means, the processing time was 120 minutes; whereas, in Example 1 using the compositing device 3 as the compositing means, the processing time was 12 minutes. In addition, as shown in Table 1 above, in Example 1 in which the compositing device 3 was used as a compositing means, it was possible to process an amount of about 1.5 times larger than in Example 2 in which the ball mill was used as a compositing means at a time. From the above, it has been verified that in the first compositing step and the second compositing step, compositing in the case of using the compositing device 3 can be performed efficiently in a larger amount and in a shorter time than in the case of using the ball mill.

Figure 5A:
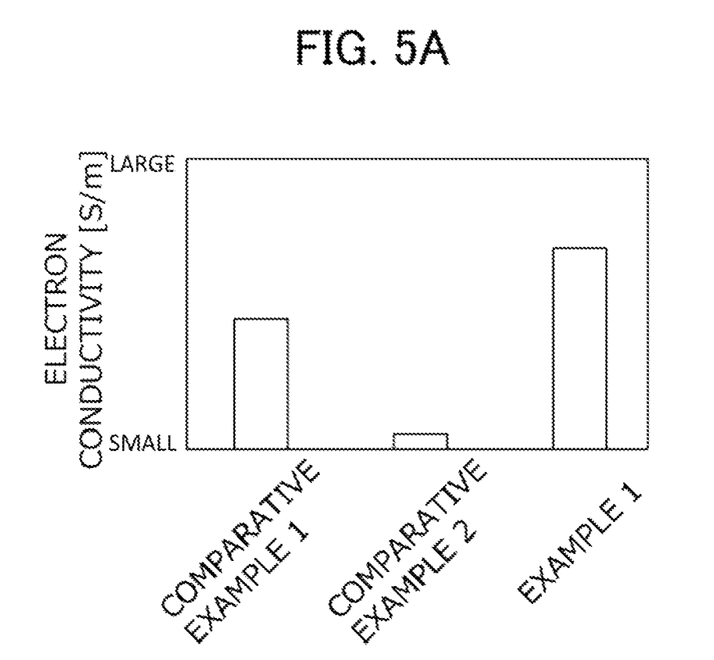
FIG. 5A is a graph comparing the electron conductivity among Comparative Example 1, Comparative Example 2, and Example 1.
Figure 5B:
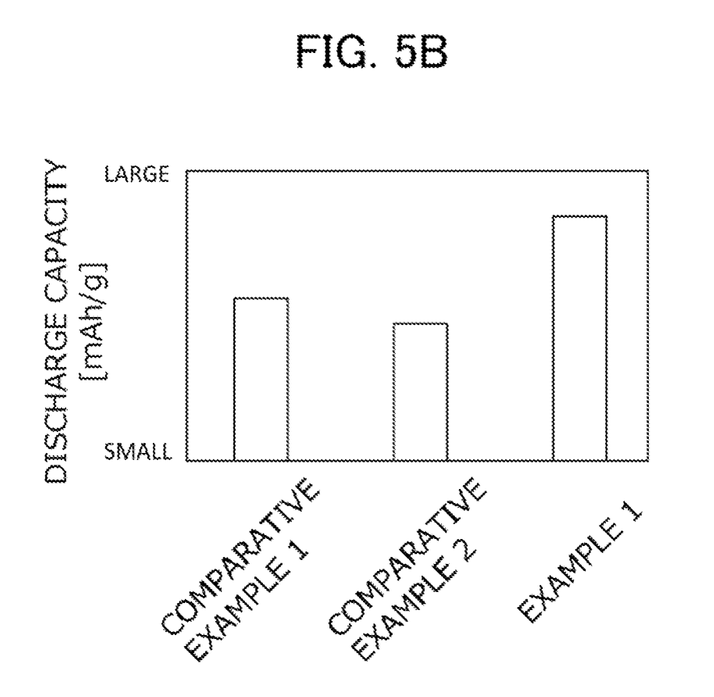
FIG. 5B is a graph comparing the discharge capacity among Comparative Example 1, Comparative Example 2, and Example 1.

FIG. 5A is a graph comparing the electron conductivity S/m among Comparative Example 1, Comparative Example 2, and Example 1. FIG. 5B is a graph comparing the discharge capacity per mass mAh/g of the electrode materials in Comparative Example 1, Comparative Example 2, and Example 1.

Figure 6:
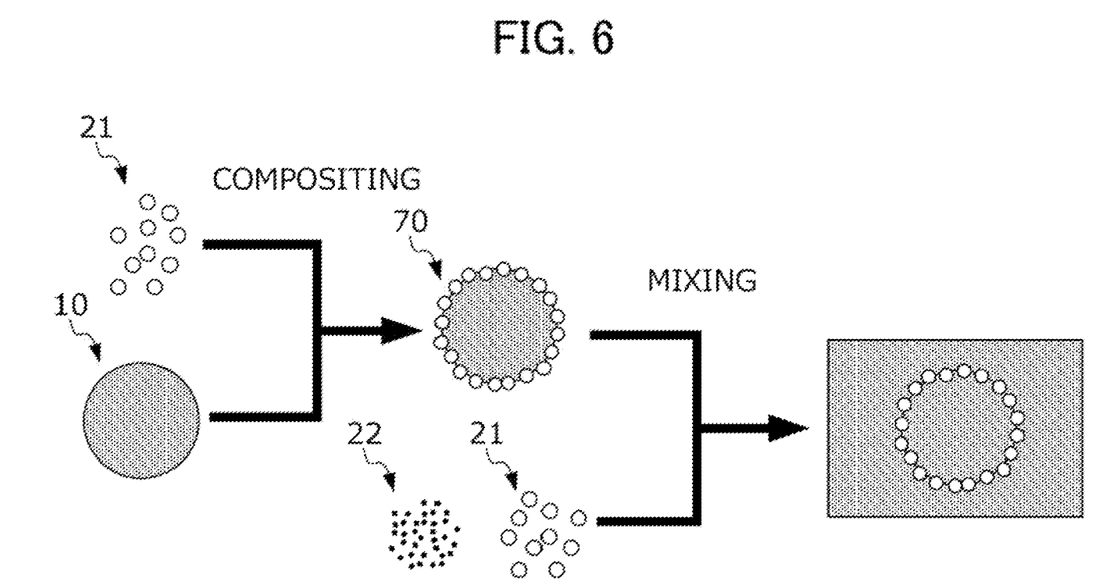
FIG. 6 is a diagram schematically showing a procedure of an electrode material manufacturing method according to Comparative Example 2.

In Comparative Example 2, an electrode material manufactured by the electrode material manufacturing process as shown in FIG. 6 was used. More specifically, in Comparative Example 2, an electrode material manufactured by mixing a composite material 70 obtained by compositing the coated active material 10 and the solid electrolyte 21 by the compositing device 3, and the solid electrolyte 21 and the conductive auxiliary agent 22 by a ball mill was used.

As shown in FIGS. 5A and 5B, the electron conductivity and discharge capacity of Example 1, which undergo the first compositing step and the second compositing step, are larger than the electron conductivity and discharge capacity of Comparative Example 2, which do not undergo the compositing of the solid electrolyte and the conductive auxiliary agent. Thus, it has been verified that, by manufacturing the electrode material which undergoes the first compositing step and the second compositing step, both the electron conductivity and the ionic conductivity can be improved, and thus the discharge capacity can be increased.

While an embodiment of the present invention has been described above, the present invention is not limited thereto. Within the spirit of the present invention, the details thereof may be changed as appropriate.

For example, in the above embodiment, a case has been described in which the coated active material 10 is prepared by performing the step of preparing the coated active material, and the second composite material 40 is manufactured by coating at least a portion of the surface of the coated active material 10 with the first composite material 20 in the second compositing step. However, the present invention is not limited thereto. For example, the second composite material may be produced, without performing the step of preparing the coated active material, by coating at least a portion of the surface of the positive electrode active material 11 which does not undergo the step of preparing the coated active material with the first composite material 20 in the second compositing step.

EXPLANATION OF REFERENCE NUMERALS 10 coated active material (active material)
11 positive electrode active material (active material, active substance)
12 coating layer (oxide-based solid electrolyte)
20 first composite material
21 solid electrolyte
22 conductive auxiliary agent
3 compositing device
40 second composite material
50 electrode material
60 all-solid-state battery

What is claimed is:

1. A method for manufacturing an electrode material of an all-solid-state battery, the method comprising steps of:
   first compositing to manufacture a first composite material containing a solid electrolyte and a conductive auxiliary agent that covers at least a portion of a surface of the solid electrolyte by compositing the solid electrolyte and the conductive auxiliary agent weighed at a first blending ratio by applying shear force; and
   second compositing to manufacture a second composite material containing an active material including at least an active substance and the first composite material that covers at least a portion of a surface of the active material by compositing the first composite material and the active material weighed at a second blending ratio by applying shear force.

2. The electrode material manufacturing method according to claim 1, further comprising a step of:
   manufacturing a coated active substance by covering with an oxide-based solid electrolyte at least a portion of a surface of the active substance,
   wherein the step of second compositing includes covering, with the coated active substance as the active material, at least a portion of a surface of the active material with the first composite material.

3. The electrode material manufacturing method according to claim 2, further comprising a step of:
   mixing the second composite material, the conductive auxiliary agent, and the solid electrolyte, weighed at a third blending ratio, to manufacture the electrode material.

4. The electrode material manufacturing method according to claim 1, further comprising a step of:
   mixing the second composite material, the conductive auxiliary agent, and the solid electrolyte, weighed at a third blending ratio, to manufacture the electrode material.

* * * * *